Feb. 22, 1927.

C. W. ERWIN 1,618,869

ANTISKIDDING DEVICE

Filed May 31, 1924

INVENTOR
Cyril Wade Erwin
Watson E. Coleman
ATTORNEY

Patented Feb. 22, 1927.

1,618,869

UNITED STATES PATENT OFFICE.

CYRIL WADE ERWIN, OF RURAL VALLEY, PENNSYLVANIA.

ANTISKIDDING DEVICE.

Application filed May 31, 1924. Serial No. 717,117.

This invention relates to anti-skidding devices for automobiles and more particularly to the cross chain type of anti-skidding device.

An important object of the invention is to provide a device of this character which may be readily applied to a vehicle and in which a maximum anti-skidding surface is provided including chains so constructed that these chains do not come into contact with one another so as to cause unpleasant rattling noises during operation of the device.

A further object of the invention is to provide a device of this character which may be very firmly applied to a wheel without the chains being tightly bound against the surface of the tire, which binding, as is well known to those familiar with the art, has a tendency to cause these chains, since they may not shift upon the tire, to cut into the surface of the tire and destroy the same.

A further object of the invention is to provide a device of this character which may be cheaply and readily produced and which will be durable and efficient in service.

A still further object of the invention is to provide novel and improved means for attaching such cross chains to be the wheels of vehicles in which the tire rim is demountably applied to the wheel.

These and other objects I attain by the construction shown in the accompanying drawings, wherein for the purpose of illustration is shown a preferred embodiment of my invention and wherein:—

Figure 1:
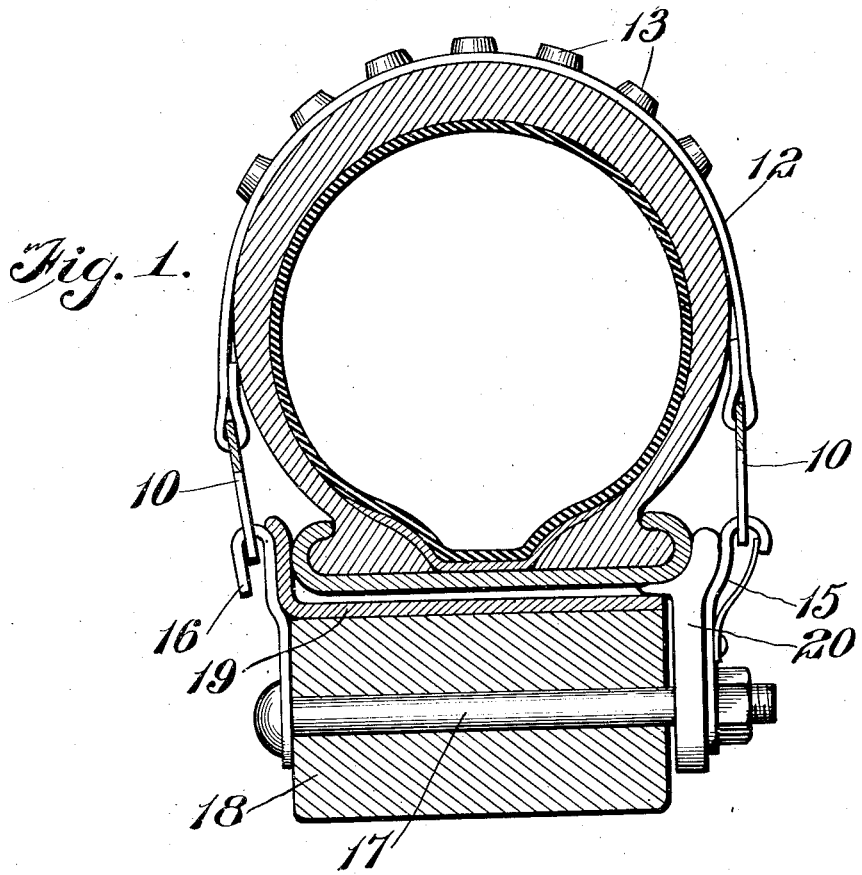
Figure 1 is a vertical sectional view through the felly and tire of a wheel having applied thereto an anti-skidding member constructed in accordance with my invention.
Figure 2:
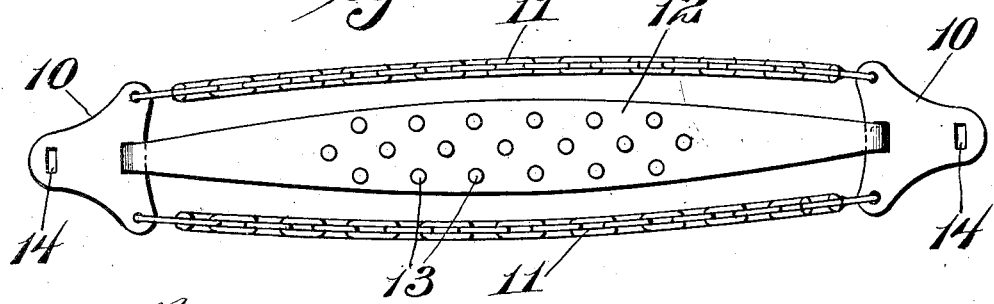
Figure 2 is a plan view of the anti-skidding member removed from the tire.
Figure 3:
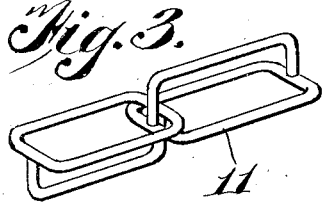
Figure 3 is a perspective view of a section of the type of chain employed.

Referring now more particularly to the drawings, the numeral 10 indicates the end plates of the cross member, these end plates being triangular in form and having attached thereto at two of the apices of the triple link chains 11 which connect the plates. Intermediate these apices the plate has secured thereto the ends of an antiskid band 12 which is preferably formed from a strip of pliable material such as raw hide. This strip preferably increases in width toward the center thereof and has secured thereto a plurality of outstanding anti-skid lugs 13 which are preferably formed from brass and riveted to the strip. The third apex of each end plate 10 has formed therein a transversely extending slot 14 the purpose of which will presently appear.

Any suitable means can be provided for attaching these cross chains to the vehicle wheels but where these vehicle wheels have demountable rims I preferably provide the structure illustrated. This structure consists of a pair of hook members 15 and 16 arranged upon the outside and inside of the wheel respectively and engaged with opposite ends of a rim clamping bolt 17. Each of these hooks is so constructed that it conforms to and fits snugly against the surface to which it is applied. That upon the inner surface of the wheel conforms to the shaping of the adjacent surface of the wheel felly 18 and fixed rim 19 and is held in position by the head and that on the outer face of the wheel conforms to the shaping of the outer face of the removable rim lug 20. The hook at the inner surface of the wheel is in the form of a simple hook and is engageable through the slot 14 of one end plate, while the outer hook is in the form of a snap hook and engages the slot of the end plate 10 at the opposite end of the cross member.

It will be seen that with a device of this character it is practically impossible for the chains to become loosened, the inner hook having a considerable depth so that there is not sufficient play in the cross member after the opposite end is engaged with the snap hook for this inner end to become disengaged and the snap hook will, of course, prevent disengagement of the outer end. In the construction of the device the anti-skidding member 13 is so constructed that it tightly and flatly fits against the surface of the tire when the cross chain is in applied position and the chains are of such a length that they are loosely engaged with the surface of a tire when the device is applied. Thus the cross member may be held fixedly in position and the chains at the same time from movement preventing their cutting into the surface of the tread of the tire.

Certain changes and modifications being possible in this structure without in any manner departing from the spirit of my invention. I do not limit myself to such specific structure as hereinbefore set forth except as hereinafter claimed.

I claim:—

An anti-skidding member comprising a member adapted to extend across the tread of a tire having a pair of similar end plates, two sides of the end plates being opposed, a pair of chains each connected at one end to one of the plates and at the opposite end at a corresponding point of the other of the plates, and a band connected at its ends to said plates intermediate the chains and of less length than the chains.

In testimony whereof I hereunto affix my signature.

CYRIL WADE ERWIN.